United States Patent Office

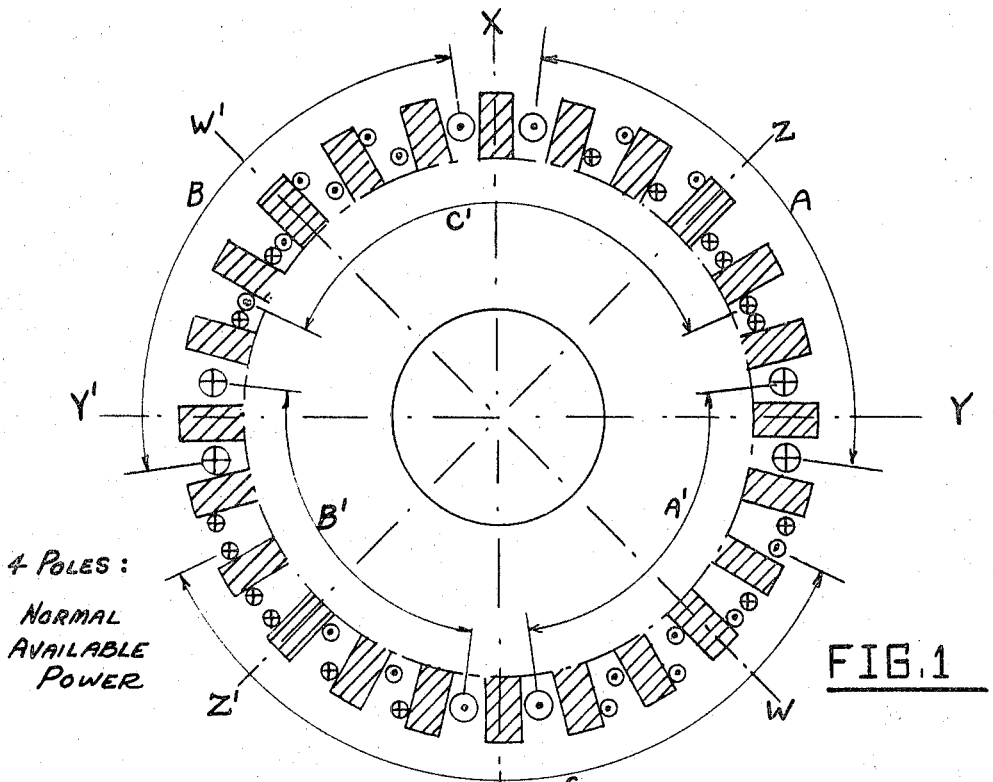
FIG.1
4 POLES:
NORMAL
AVAILABLE
POWER
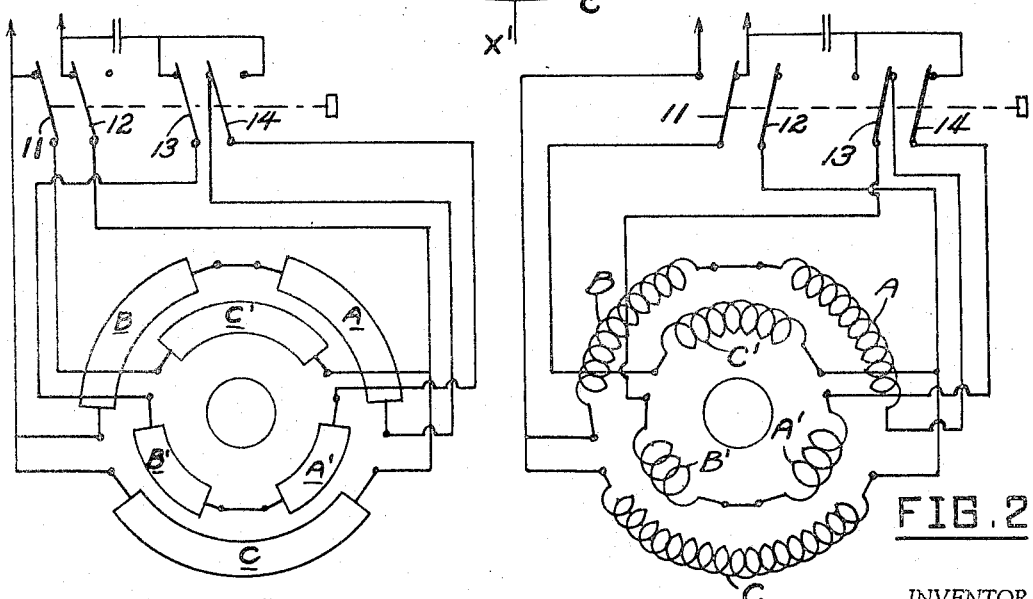
FIG.3
FIG.2
INVENTOR
LUCIANO CANADELLI
BY Sherman Levy
ATTORNEY

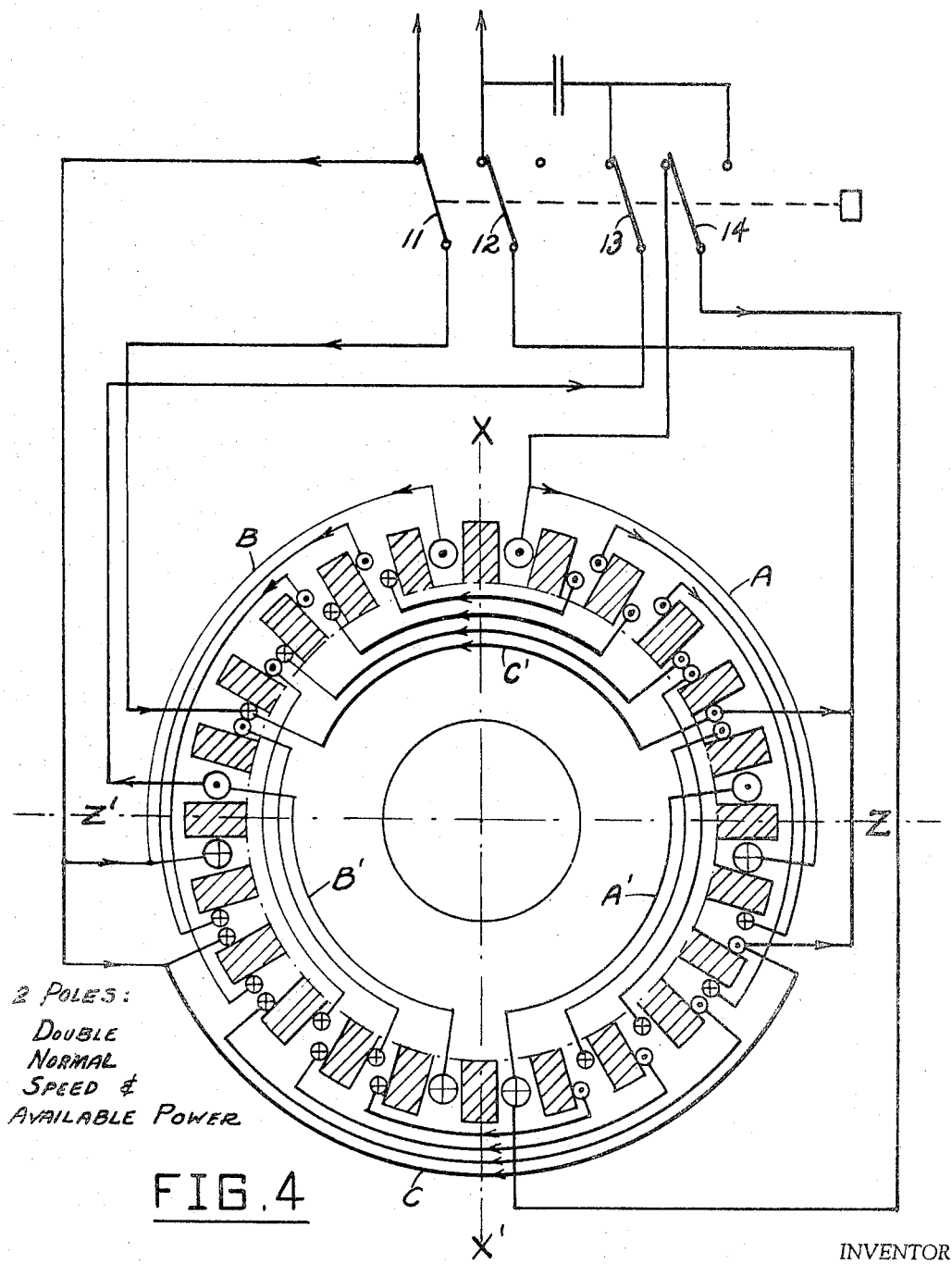

3,440,510
Patented Apr. 22, 1969

3,440,510
ASYNCHRONOUS SINGLE-BIPHASE MOTOR WITH
POWER AND POLARITY SWITCHING
Luciano Canadelli, Via Varesina, 71/B, Como, Italy
Filed June 29, 1967, Ser. No. 649,950
Int. Cl. H02k 17/06; H02p 1/42
U.S. Cl. 318—224                                    6 Claims

ABSTRACT OF THE DISCLOSURE

An asynchronous motor fed by single-phase A.C. supply current, the motor having a stator provided with two separate multiple-segment winding circuits. One of the circuits is purely inductive. The other circuit is intended as a capacitive winding, to be used in series with a capacitor to provide leading phase relative to the current in the inductive circuit. The single-phase supply is connected to these stator circuits through a duplex four-pole, double-throw switch, with wiring to provide respective series configurations of the winding segments of both circuits in a first position of the switch, and parallel configuration of the segments of the inductive winding circuit, with inversion of one of the segments thereof, and series configuration with a reversal of order of certain of the segments of the capacitive winding circuit in the second position of the switch. This switching (to the second position) shifts the stator flux vectors (or alters the flux distribution) to provide doubling of motor speed, with substantially constant available torque, and hence doubles the available power.

---

The description of the invention entails the fixation of the following parameters:

(a) Volume of the conductors of the inductive and capacitive phases.

(b) Imbricated distribution of the conductors during the two phases in the stator slots according to a proportion established by the number of slots and by the winding factors for both polarities.

(c) Determination of the couples as a function of the inductance variability of the capacitive phase in opposition to the voltage values of the single capacity adopted.

(d) Values of the stator fluxes according to the desired switching.

As clearly indicated by the denomination "single-biphase," the motors in question are asynchronous motors fed by a single-phase system and provided with two separate windings, of which: one is inductive, fed by the system; and one is capacitive fed not only by the system but also by a reactive power, in advance of the phase, determined by a suitable-value capacity. The two windings have the same volume and a number of turns differentiated only by a different winding factor for one polarity and the corresponding power, whereas for the other polarity and power the turn ratio is double, although the winding volume is the same.

The invention can be exhaustively explained only with the aid of the accompanying drawings which show, by means of a not limitative example, the practical realization of the imbricated circuits and of the relating connections in order to obtain: series connection of the inductive and capacitive circuits for one power and the corresponding polarity; inversion of half of the inductive circuit and parallel connection of the two halves; inversion of half of the capacitive circuit and maintenance of the series connection for the other polarity and corresponding power.

FIGURE 1 is a cross section taken through the stator of a motor according to the present invention.

FIGURE 2 is a wiring diagram showing the electrical circuit of the motor of FIGURE 1 in a first position of the motor control switch, wherein there is a series connection of the two segments of the inductive stator coil circuit and a series connection of the segments of the capacitive stator coil circuit.

FIGURE 3 is a wiring diagram generally similar to FIGURE 2, but showing the electrical circuit of the motor in a second position of the motor control switch, wherein one of the inductive circuit coil segments is reversed and connected in parallel with the other inductive circuit coil segment, and one of the segments of the capacitive stator coil circuit is reversed, but a series connection of the stator capacitive coil circuit is maintained.

FIGURE 4 is a cross sectional view similar to FIGURE 1, but showing conditions corresponding to the state represented by FIGURE 3.

FIGURES 1 and 4 show a stator having 24 slots with a two-layer winding: the inner one (slot bottom) with groups of coils A'B'C' placed at 120° on the stator periphery; the outer one, with groups of coils ABC also placed at 120° and symmetrically opposite the inner layer.

Coils A'B' and AB are respectively connected in series between them and form all capacitive turns in series with one only capacity of suitable value. On the drawing they are traced with thin lines.

The groups of coils C'C are those of the inductive phase and are traced with thick lines: the volumes and the turns of the two phases are equal or vary by 5%. In consideration of the different winding coefficient and of the imbricated system, they are placed in the slots in a suitable proportion to make the two phases equal.

The condition shown in FIGURE 1 corresponds to the state wherein the control switch poles 11, 12, 13 and 14 are in the positions of FIGURE 2; this provides a 4-pole connection; for the respective coils the small crosses indicate the direction of the currents entering the slots; the dots, the exit direction and, of course, such conventional marks refer to a feeding at 50 Hz. and to a time of one hundredth of a second. For the particular imbricated distribution, the center of the arc formed by the coils of the capactive phase does not represent the flux center, but the latter is formed by the current direction in the stator slots, right in the ferrous material, and precisely according to axes ZZ' and WW'. For the particular position of the coils of the inductive phase, the coil center and the center line of the poles represent the flux axes of said line and precisely XX' and YY'; these axes appear at 90 electrical degrees from those of the capacitive phase. Since all the coils are in series, the ratio $$\frac{\text{turns of capacitive phase}}{\text{turns of inductive phase}}$$

is equal to +1. The capacity required to diphase the current in advance of the phase must have a minimum value of $$\frac{\text{reactive VA}}{\text{yielded watts}} = \text{about } 1.5$$

Since the flux per pole couple is determined by the average induction ($B_m$) in the air gap multiplied by the polar surface in sq. cm. involved, and since the latter represents ¼ of the whole air gap surface, the power will be as follows:

$B_m \times ¼$ of the total polar surface

The winding coefficients for the design as per FIGURE 1 are the following:

Inductive phase _____ 0.83
Capacitive phase _____ 0.8

The state shown in FIGURE 4 (2 poles) shows the double-throw switch in a position opposite to that of FIGURE 2, and corresponding to FIGURE 3.

The first set of poles 11, 12, besides causing the inversion of the group of coils C' and therefore one only flux according to axis XX', puts the two branches of the inductive circuit in parallel. The power will therefore be according to:

$B_m \times \frac{1}{2}$ of the polar surface which means double power as compared with the condition represented by FIGURES 1 and 2 (4 poles). The positions of the capacitive phase inverser poles 13, 14 only carries out the inversion of the inner coils A'B' causing one only flux according to axis ZZ' at 90° from the inductive axis, but maintains all the conductors in series. In this way the ratio $$\frac{\text{capacitive turns}}{\text{inductive turns}} = +2$$

is provided, corresponding to the value of the same capacity put into a circuit of double power according to the mathematical principle which is believed unnecessary to develop here:

$$\frac{\text{reactive VA}}{2 \text{ yielded watts}} = \text{about } 0.75$$

If the connection of FIGURES 3 and 4 intervene, however, the different winding factors which modify in a favorable way the above ratios:

Inductive phase _____ 0.675
Capacitive phase _____ 0.6 in order to avoid dangerous voltages at the ends of the inductance and capacity.

The present invention is fit for application in any biphase distribution system where, of course, the rephasing capacity is not necessary. In the three-phase system, with polarity switching (triangle-double row), powers are nearly equal; in the present biphase system, besides the pole-switching, also powers change over by about double from one to the other switch polarity.

The invention has been described and illustrated with the aid of the accompanying figures which are not to be considered a limitative example. It goes without saying that improvements can be made without exceeding the limits of the invention itself.

What is claimed is:

1. An asynchronous motor including a stator provided with two separate multiple-segment winding circuits, one of said winding circuits comprising a pair of oppositely located inductive windings and the other winding circuit comprising a plurality of angularly spaced capacitive windings, a pair of single-phase supply conductors, capacitance means, a four-pole, multiple-position switch, circuit means connecting said inductive windings in series to said supply conductors when said switch is in a first position, circuit means connecting said capacitive windings in series through said capacitance means to said supply conductors when the switch is in said first position, circuit means connecting said inductive windings in parallel and reversing one of said inductive windings when the switch is in a second position, and circuit means reversing part of the capacitive windings but maintaining a series connection of the capacitive windings with the capacitance means to the supply conductors when the switch is in said second position.

2. The asynchronous motor of claim 1, and wherein the stator windings comprise two layers, each layer comprising three windings spaced at approximately 120° from each other.

3. The asynchronous motor of claim 2, and wherein the two layers comprise an inner layer and an outer layer, the windings being in symmetrically imbricated relationship.

4. The asynchronous motor of claim 3, and wherein said capacitance means comprises a single capacitor.

5. The asynchronous motor of claim 4, and wherein the windings are distributed to provide a flux distribution corresponding to four poles when the switch is in said first position and a flux distribution corresponding to two poles when the switch is in said second position.

6. The asynchronous motor of claim 5, and wherein the volumes of the inductive windings and the capacitive windings are substantially equal.

References Cited

UNITED STATES PATENTS

| | | | |
|---|---|---|---|
| 1,912,337 | 5/1933 | Kennedy | 318—224 XR |
| 2,896,144 | 7/1959 | Mollenberg | 318—224 |

ORIS L. RADER, *Primary Examiner.*

G. Z. RUBINSON, *Assistant Examiner.*

U.S. Cl. X.R.

318—225